(12) United States Patent
Gray

(10) Patent No.: US 7,693,809 B2
(45) Date of Patent: Apr. 6, 2010

(54) CONTROL INTERFACE FOR ENVIRONMENT CONTROL SYSTEMS

(75) Inventor: Josh Thomas Gray, Portland, OR (US)

(73) Assignee: Home Comfort Zones, Inc., Beaverton, OR (US)

( * ) Notice: Subject to any disclaimer, the term of this patent is extended or adjusted under 35 U.S.C. 154(b) by 294 days.

(21) Appl. No.: 11/520,408

(22) Filed: Sep. 12, 2006

(65) Prior Publication Data

US 2008/0121729 A1 May 29, 2008

(51) Int. Cl.
*G06F 17/00* (2006.01)
*G06N 5/00* (2006.01)

(52) U.S. Cl. .............................. 706/45; 236/51; 710/52

(58) Field of Classification Search .................... 706/45; 710/52; 236/51

See application file for complete search history.

(56) References Cited

U.S. PATENT DOCUMENTS

| | | | |
|---|---|---|---|
| 3,796,367 A | 3/1974 | Rifkin | |
| 3,806,027 A | 4/1974 | Ginn et al. | |
| 4,018,160 A | 4/1977 | Cunningham et al. | |
| 4,077,310 A | 3/1978 | McCabe, Jr. et al. | |
| 4,102,494 A | 7/1978 | Coleman et al. | |
| 4,176,690 A | 12/1979 | Clark et al. | |
| 4,238,071 A | 12/1980 | Post | |
| 4,298,164 A | 11/1981 | Post | |
| 4,324,358 A | 4/1982 | Tulowiecki et al. | |
| 4,522,116 A | 6/1985 | Tartaglino | |
| 4,545,524 A | 10/1985 | Zelczer | |
| 5,143,287 A | 9/1992 | Jardinier | |
| 6,345,325 B1 * | 2/2002 | Baskey et al. ................. 710/52 |
| 6,428,680 B1 | 8/2002 | Kreichauf | |
| 6,983,889 B2 | 1/2006 | Alles | |
| 6,997,390 B2 | 2/2006 | Alles | |
| 2004/0182941 A1 * | 9/2004 | Alles .......................... 236/49.3 |
| 2005/0096789 A1 * | 5/2005 | Sharma et al. .............. 700/245 |

FOREIGN PATENT DOCUMENTS

| EP | 0079087 | 5/1983 |
|---|---|---|
| GB | 065333 | 6/1981 |

OTHER PUBLICATIONS

"Notice of Allowance Mailed Jan. 28, 2005 for U.S. Appl. No. 10/249,198".
"OA Mailed Nov. 10, 2004 for U.S. Appl. No. 10/249,198".

* cited by examiner

*Primary Examiner*—David R Vincent
*Assistant Examiner*—Kalpana Bharadwaj
(74) *Attorney, Agent, or Firm*—Blakely Sokoloff Taylor & Zafman LLP

(57) ABSTRACT

A method and apparatus for a control interface for environment control systems. An embodiment of a controller for a climate control system includes a memory to store a plurality of constraints for the climate control system and a processor to choose a current climate control activity, the current climate control activity being based at least in part on the constraints. The controller includes a user control interface to provide information to a user, the information identifying the current climate control activity of the climate control system and a constraint that influenced the choice of the current activity.

28 Claims, 6 Drawing Sheets

CONTROL INTERFACE FOR ENVIRONMENT CONTROL SYSTEMS

FIELD

An embodiment of the invention relates generally to environment control systems, and more specifically to a control interface for environment control systems.

BACKGROUND

Modern environment control systems may combine numerous different elements that are controlled in various different ways. If, for example, a climate control system includes a sophisticated control system, there may be multiple settings and preferences that affect system performance.

In the operation of a sophisticated system, a user may wish to determine what the climate control system is doing at a certain point in time, as well as why this activity is taking place. However, it is difficult for a user to discern why a sophisticated climate control system, which may utilize many varied constraints, is or is not engaged in a particular activity because the unit generally does not provide the necessary information and context.

Further, if a user wishes to change a current activity and the user is aware of the relevant settings that are responsible for such activity, it is then necessary to modify such settings. If the system has multiple settings, the user will be required to locate the necessary setting or settings, which may become more difficult or very time consuming as the system becomes more complex and the number of user settings increases.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
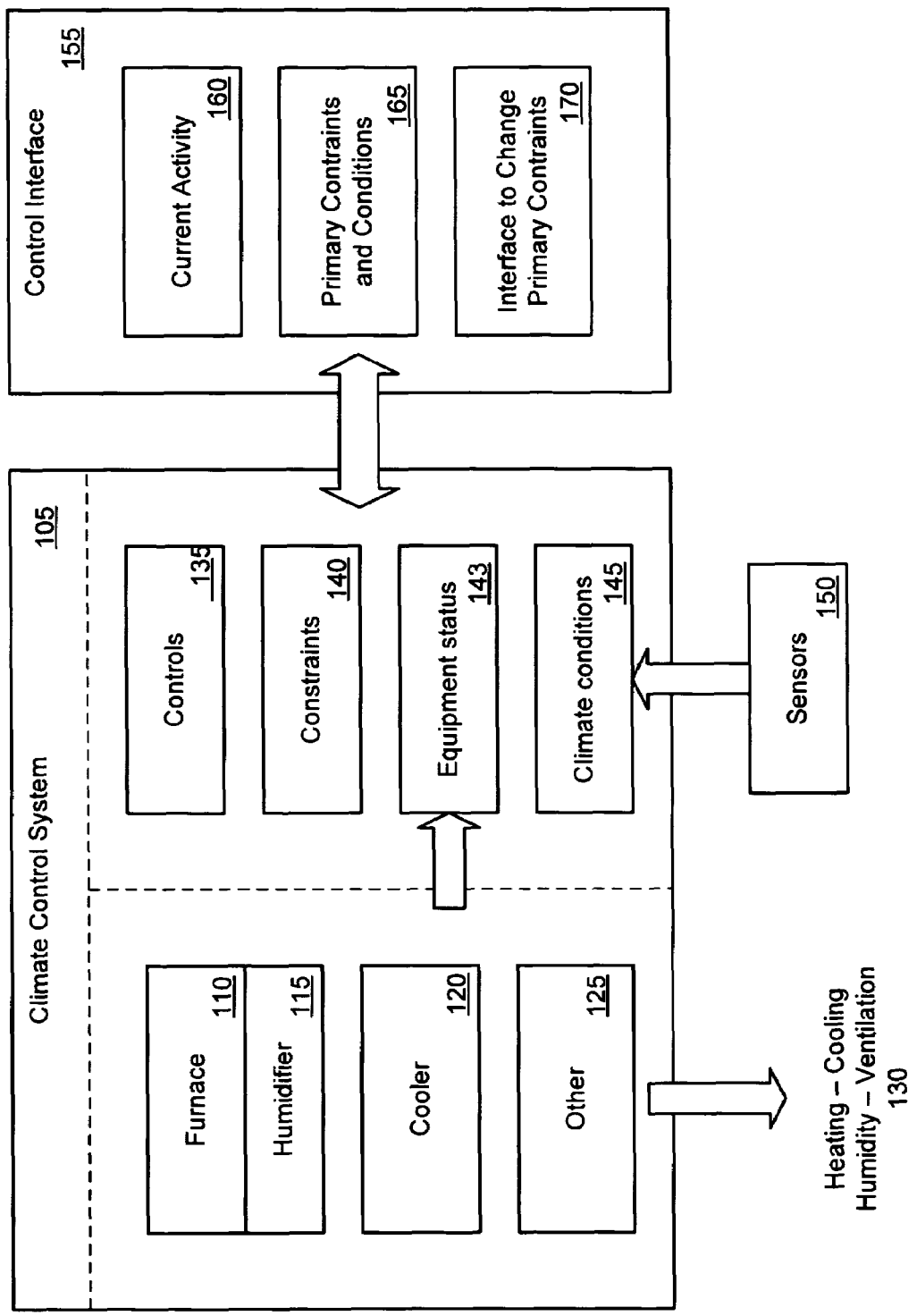
FIG. 1 is an illustration of an embodiment of a climate control system with activity explanation and control.

A method and apparatus are described for a control interface for environment control systems.

As used herein, "climate control" means any process or mechanism to control climate conditions in an interior space. The term "climate control" includes, but is not limited to, heating, cooling, humidification, dehumidification, and air filtering. Climate control units or systems include HVAC (heating, ventilation, air conditioning) systems. Climate control units or systems include operations in which climate conditioning is provided by forced air, radiant heat, or any other process of delivering climate conditioning.

As used herein, "environment control" means any process or mechanism to control the environment of a building or facility. The term "environment control" includes, but is not limited to, climate control and control of lighting, audio and visual systems, security, and any other environment factors.

As used herein, "climate condition" or "condition" means any climate status including, but not limited to, temperature and humidity. Climate conditions may include both interior (inside) and exterior (outside) values.

As used here, "equipment data feed" means any data regarding the status of environment control equipment. Examples of equipment data feeds may include, but are not limited to, the temperature inside a furnace's air handler, the amount of airflow in a portion of a system, and any other equipment operational data.

As used herein, "control constraint" or "constraint" means any setting, preference, input, or limitation affecting the operation of environment control. Constraints may include constraints that are in conflict with or that need to be weighed together with other constraints. Constraints include, but are not limited to, indoor and outdoor temperature limits, ventilation preferences, efficiency and comfort preferences, and any other element affecting the operation of an environment control system.

As used herein, "control activity" means any action, non-action, condition, or status of an environment control system. Control activities include climate control activities such as furnace operation, cooler operation, humidifier operation, the lack of operation of any unit, air circulation level, damper settings, blower settings, and plenum or other component status.

As used herein, "scarce resource" or "shared resource" means a resource, including an equipment unit, that is limited and that is shared for multiple needs or uses. A "scarce resource" may include, but is not limited to, a furnace of a climate control system, which is used to heat multiple different areas of a building.

As used herein, "airflow control mechanism" means any mechanism or device intended to control or direct the flow of air for a climate control system, including devices intended to cut off or limit air flow. Airflow control mechanisms include, but are not limited to, vents, dampers, inflatable bladders, and other similar devices.

In an embodiment of the invention, an environment control system includes a control interface to indicate a current environment control activity and the constraints that influence the choice of such activity. In one embodiment, a climate control system includes a control interface to indicate the current climate control activity of the system and the primary constraints that influence the choice of the current activity. The control interface may also provide the primary climate conditions that influenced the choice of the current activity. In an embodiment of the invention, a climate control system provides a direct method of modifying the primary constraints influencing the current activity.

A climate control system may include a system provided by Home Comfort Zones, Inc. In one particular example, a climate control system includes:

(1) Multiple wired sensors, wireless sensors, or both to measure climate conditions and equipment conditions. Examples of equipment conditions may include the temperature in the furnace plenum, the amount of airflow in a portion of the duct work of a climate system, etc.;

(2) Multiple airflow control mechanisms to control the location and rate of airflow; (3) Climate control equipment interface and control circuitry; (4) Control software and electronics; and (5) One or more control interfaces for user interaction (including touch screens, serial command interfaces, and other user interfaces).

In the operation of a climate control system, the use of scarce resources, such as the furnace, for multiple different areas results in a condition in which it is not possible to directly meet each individual constraint for every area of the system. Among the reasons for this are:

(1) In a complex system, constraints may be abstract and not expressed directly in terms of data feeds.

(2) Constraints may often be in conflict with each other. In one possible example, a temperature setting may conflict with an economy setting.

(3) The physical system may prohibit meeting the constraints because of practical limitations. For example, the constraints for a first region may require heating, while the constraints for a second region may call for cooling, and the operation with the scarce furnace resource makes the simultaneous heating and cooling operations for the climate control system impossible.

In an embodiment of the invention, a climate control system allows various control constraints to be established through any of its control interfaces to influence how the system controls the space that is provided climate control management. In particular, such control interfaces influence the use of scarce resources, such as the climate control units (furnace, air conditioner, and others). In certain instances the control constraints may be stated in terms that are directly related to particular sensor readings. In other instances the control constraints may be more semantically abstract, in which case the climate control system exerts the semantic influence of the control constraints on the control logic for the system. Examples of such control constraints include:

(1) A simple heat set-point that indicates a desire to keep the measured temperature of a portion of the space above a given point or within a given range.

(2) An outside temperature threshold for air conditioning. In this instance, the climate control system would not air condition any portion of the space when the outside temperature was below this threshold.

(3) A desired level of circulation (e.g., High, Medium, Low). The desired level of circulation would influence how aggressively the system manages airflow during circulation to keep temperatures balanced.

There could be many constraints (hundreds in certain circumstances) active at any given time while the climate control system is managing the climate space. These constraints may be in conflict with one another. In an embodiment of the invention, a climate control system monitors the various data feeds, evaluates the active control constraints, and ultimately makes decisions about how to operate the climate control equipment (heat/cool/circulate, what stage of conditioning, etc.), which may include the positioning of airflow control mechanisms. In an embodiment of the invention, to keep the user apprised of the current state of the system, a climate control system may provide an indication of the current climate activity on one or more control interfaces. In an embodiment of the invention, this may include the activity of individual regions of the facility as well as the activity of the central climate control equipment (heating, high heating, auxiliary heating, cooling, etc.) In an embodiment of the invention, a system makes available via its control interfaces information about the conditions and constraints most prominently influencing its current activity. The information provided by the climate control system may include information about why the system is engaged in its current activities, as well as why it isn't engaged in any of the other possible activities.

In an embodiment of the invention, the system also provides access to control entries to allow the user to temporarily or permanently modify the control constraints primarily affecting the current system climate control activity, the access being provided conveniently from where the information about the specific control constraints in effect is presented. In an embodiment, the system allows direct access to control menus or screens to change the relevant constraints, providing shortcuts to certain entries based on what the current activities of the system are. This process allows quick, directed control of the most relevant system parameters, and assists the user in managing the multitude of possible control constraints in the entire system. In this manner, users are not required to figure out which specific control constraints are directly affecting the system's current activity, and do not have to remember where to change control constraints via normal menus or mechanisms, which might, for example, be several layers deep in a control menu structure.

In an embodiment of the invention, a climate control system presents context-sensitive information relevant to helping the user better understand the functionality of the system and to quickly make changes to modify the activities of the system. In one example, if a climate control system is not cooling when the user observes the activity explanation, the system may inform the user regarding relevant constraints affecting the system operation and may inform the user that, for example, the user may adjust a temperature setting on one or more of multiple remote wireless sensor or control devices to affect cooling.

In one particular example, a climate control system is not providing air conditioning at a certain point in time. The user examines the current activity indicated by the control interface and sees that air conditioning is not being provided because all rooms are within their set-point constraints. From this point, the user is provided access to the temperature schedules, where the user can adjust the set-points for the rooms.

In another example, the climate control system is currently cooling. By way of the control interface the user is informed that the system is cooling the master bedroom because the master bedroom is above its configured cool-to set point. However, another room in the house is below its heat-to set point. The system may indicate that it is not heating because there is cooling needed elsewhere in the house and that cooling has been configured to a higher priority than heating. From this activity explanation the user is provided the option to, for example, reconfigure the relative priorities of heating versus cooling. If a user makes a change to the relative priorities, this change may then affect system control decisions.

In another example, the climate control system is circulating air through portions of a building, but one or more rooms are below their heat-to temperatures. The user uses the control interface to see an explanation of the most relevant constraints that are driving the system to choose circulation over other options. The user also sees an explanation of why the system has chosen not to heat. In this example, the explanation indicates that the current outside temperature is 65 degrees, which is above the configured constraint that prevents running the heat when the outside temperature is above 62 degrees. The user then is provided convenient access from this explanation to directly change the never-heat-above constraint. For example, the user adjusts it to 68 degrees. The user is further given the option for this to be temporary (automatically reverting to the old value after some time period) or permanent. In one example, the user may choose a temporary override for two hours duration. At this point, the system then starts heating. After the two-hour override period has expired, the old constraint returns into effect. If at that time the outside temperature was still 65 degrees the system would no longer provide heat, even if heating was otherwise called for.

In an embodiment of the invention, a climate control system may support many abstract climate control constraints. In an example, these are constraints that cannot be directly expressed in terms of a single sensor data stream. The constraints represent more abstract characteristics of the desired system behavior. The system manifests these as indirect influences on algorithmic decisions taking into account multiple data values and constraints simultaneously. For this reason, the user may be unable to discern the reasons for certain control decisions based solely on sensor data. In an embodiment of the invention, a climate control system explains to users how certain abstract climate control constraints affect system activities, and provides simple access to the constraints to make modifications as needed.

For example, certain abstract constraints and how such constraints may be manifested are as follows:

Control vs. Economy Setting—In an embodiment, a constraint may be provided allowing the user to express the user's preference with regard to temperature control versus economical system operation. This might take the form of, for example, selecting from among two or more options along a spectrum where one end semantically represents most economy and the other represents most control. Intermediate settings would indicate linear or non-linear but ordered intermediate values between the two extremes.

The system may map various values of this selection to some or all of the following:

(a) Average or aggregate degrees outside of set-points allowed before a conditioning cycle is initiated to meet the need across a set of rooms. A more economy setting would allow greater average or aggregate need to accumulate before the cycle was initiated to promote longer, more economical cycles. A more control setting would result is less average or aggregate need to accumulate before a cycle could be initiated. Intermediate settings on the comfort/economy spectrum would be mapped to various amounts of average or aggregate need in between. The mapping could be linear or non-linear.

(b) Average or aggregate degrees of over-conditioning allowed when a cycle is running before the cycle is considered complete and terminated. More average or aggregate degrees of over-conditioning could correlate with a setting of more economy if it enabled more efficient equipment cycle lengths. In this case less average or aggregate degrees of over-conditioning would correlate with a setting of more control.

(c) Relative priority given to rooms affected by recent user settings changes would be prioritized according to control vs. economy setting. A setting biased toward more control would correlate with higher priority weighting given to rooms where a user has recently indicated a change in temperature is desired via a control action on a smart controller or the main touch screen. Similarly an indication in preference to more economy would weight recent user activity less versus longer equipment cycle times and more rest time between cycles. In this case the system could give more mathematical weight to other direct data constraints in the system that weren't directly changed in the recent past by user activity.

(d) Automatic adjustment of active set points based on observed or inferred load. Through its various data feeds the system has direct and indirect indication of the conditioning load on each individual room. One example of a direct indication is an outside temperature reading. The greater the outside temperature, the larger the cooling load will be. An example of an indirect indication is the amount of cooling applied over a recent time period relative to the change in temperature in the area. Trending this over time for the same room gives indication of changes to conditioning load. For example, a great deal of cooling has been applied to a room over the last hour and the temperature has cooled less than on previous similar occasions, this may provide an inferred indication of increased cooling load. The climate control system could combine direct and indirect indications of conditioning load with an indicated preference of control versus economy to dynamically adjust set-point constraints in effect. A setting of more control would leave the set-points unadjusted to minimally adjusted regardless of conditioning load. A setting of more economy would adjust the set-point constraint proportionately to the increased load to relieve the amount of conditioning delivered, and thus improving the economy when unusual excessive loads are observed.

(e) Some climate control equipment provides two or more stages of conditioning of a particular type. For example there may be a low heat and a high heat. Each stage delivers a different amount of heat over the same unit time. A setting of more economy would weight decisions to use lower stages for longer periods of time while more control would utilize higher stages of conditioning more aggressively to achieve desired temperatures. The temperature differentials being made up would be included in this calculation. The greater the differential the greater control advantage jumping to a higher stage of conditioning could have.

(f) Certain climate control systems have an outside air economizer installed. This element allows warm air to be removed from the house and cooler evening outside air to be added into the house when the home is still warm. This process provides a more economical means of cooling hot houses in the evening when the outside temperature has dropped below the inside temperature of the home. An air conditioner typically provides conditioned air that is less than 55°, which can be cooler than evening outside air in many regions. Simply exchanging inside air for outside air can effectively cool the inside of a house more economically than actively running an air conditioner for certain temperatures. A more economy versus more control setting would influence the switch-over algorithm affecting when the air conditioner was used and when the inside air was exchanged with outside air. This would be a function of some combination of various inside temperatures, inside conditioning need (delta between temperature and set-to targets), outside temperature and historical effectiveness of temperature change based on conditioning temperature differential.

Because there are so many potentially indirect influences of a more control vs. more economy user setting (or any other similar setting) the ability to map actual system behavior (e.g., why is the system heating this room?) back to the influence this setting may potentially be critical to effective system use. In an embodiment of the invention, the climate control system may provide information regarding the effect of the constraint on current activities, and provide simple access to a modification of the constraint.

In an embodiment of the invention, a climate control system may also provide guidance as to the magnitude of adjustment necessary to enable a particular activity to commence. In one example, the system may indicate what setting on the control versus economy spectrum would allow cooling to start under the current conditions. In a another example, the system may indicate what temperature setting is required for a particular constraint to start a heating or cooling process Airflow/Noise Acceptability—Embodiments of the inventions may include, but are not limited to, systems utilizing forced air system conditioning, which relies on the movement of air to deliver heat or cooling to target areas in order to maintain a target temperature. The movement of air can be felt and heard by people in the target areas. This includes both when the airflow rate is transitioning (higher/lower, on/off) and in steady state of delivery (blowing at a certain level). Depending on the room utilization, time of day, number of occupants, and other factors, the acceptability of air noise and flow may vary. For example, it might be desirable to keep a nursery to a low level of air flow and noise while allowing the air flow in a kitchen to be greater if necessary.

In an embodiment of the invention, a climate control system has several direct and indirect influences on the amount and type of airflow delivered to respective rooms:

(a) Whether or not cycles are run. If the fan is not on, no airflow will blow.

(b) Equipment start/stop sequences. Turning the fan on explicitly with heating is different with most air handlers than turning on the heating control line alone.

(c) Air control device sequence with startup and transition. In an example, climate control equipment can be started with all or a majority of airflow control mechanisms open, with the mechanisms then gradually closing after the cycle is underway. This provides a more gradual transition of airflow in the target rooms. Similarly, opening up more airflow control mechanisms just prior to cycle shut-down can smooth shut-down airflows.

(d) Stage of conditioning to run on the climate control equipment. Discrete heating or cooling stages are generally associated with different amounts of airflow.

(e) Number of airflow control mechanisms to close to target conditioning. The more that are closed, the more focused the conditioning will be, but the higher the airflow.

In an embodiment of the invention, an abstract control constraint allowing two or more discrete selections along a spectrum from more airflow to less airflow, or alternatively from more noise to less noise is supported. Various selections for this setting would map directly into algorithmic adjustments as, for example, provided here.

Because the airflow/noise setting is an abstract setting that is not expressed directly in terms of a single data stream and because it can significantly influence how multiple data streams are interpreted by the algorithms to control the system, in an embodiment of the invention an activity explanation may provide a description of this influence on the current activity. By explaining that a cycle isn't being run because the airflow objectives couldn't be met considering the current room temperatures and plenum readings and allowing users the facility to make this change directly, the system becomes immensely more effective and usable.

Room Priority—With a scarce shared resource (e.g., a furnace) being shared in the climate control management of discrete target rooms, there are often situations where the demands of individual target rooms conflict in indicating what should be happening with the shared resource. An example is a situation in which a single room is below its set-to temperature (thus calling for heat), but no other rooms are similarly calling for heat. The duct and equipment capacity of a climate control system in the vast majority of cases would not allow the entire furnace's airflow to be directed into a single room. A decision must therefore be made whether to prevent a cycle from being run, and thus not address the indicated need, or to run a cycle including other rooms that have no direct need for heat, thus spilling the "extra" heat to adequately handle the furnace's minimum airflow requirement.

In an embodiment of the invention, an abstract priority control may allow a user to indirectly specify relative priorities among different rooms, perhaps dependant upon different times of day. The priorities then may be factored into the decision-making algorithms when either-or determinations must be made.

Some examples of how a room priority setting would influence various direct algorithms for control data interpretation in an embodiment of the invention:

(a) When weighing conditioning need versus "spilling" excess conditioning, the relative priorities of the rooms involved may influence both the decision whether or not to run a cycle and the determination where to best "spill" the excess conditioning if a cycle is run. Over-conditioning a lower-priority room even at a slightly more over-conditioned temperature is preferable to a higher-priority room at a lesser state of over-conditioning.

(b) In making decisions between conflicting needs, the relative priority between rooms may be valuable. For example, a situation may arise in which one room is calling for cooling while another room is calling for heating. Factoring room priority in with other factors, such as outside temperature, outside temperature trend, inside temperature trend, etc., can result in a better decision on whether to heat or cool.

(c) There may be timeout delays for the climate control equipment to smooth the cycle behavior and reduce unnecessary wear on the equipment. The duration of these delays could be influenced by the aggregate priority of the rooms requiring conditioning and the magnitude of their conditioning. Higher priority rooms having more need could shorten delays that prevent a cycle from being initiated to address that need.

FIG. 1 is an illustration of an embodiment of a climate control system with activity explanation and control. In this illustration, a climate control system has one or more climate control units, which may include a furnace 110 (possibly including a humidifier unit 115) a cooler 120, and other units 125, such as ventilating units or air cleaners. The output may include heating, cooler, humidified air, or air ventilation 130. The climate control system 105 includes controls 135 for the climate control units, the control of which may be affected by various constraints 140, the climate control equipment status 143, and various climate conditions 145, including certain existing temperatures. The climate conditions 145 are derived from data feeds from various sensors 150, while the equipment status 143 is based on data feeds from the climate control units.

The climate control system 105 includes or operates with one or more control interfaces 155. A user accesses the control interface 155 to obtain information regarding the climate control system 105 and to input control settings. In an embodiment of the invention, the display may include information regarding current activity 160 of the climate control system and information identifying one or more primary constraints or conditions 165 causing or influencing the current activity of the climate control system. The display and interface also may directly display an interface to change or override the identified constraints 170. The display may include information regarding what changes are needed in order to influence the current activity 160 of the climate control system 105.

Figure 2:
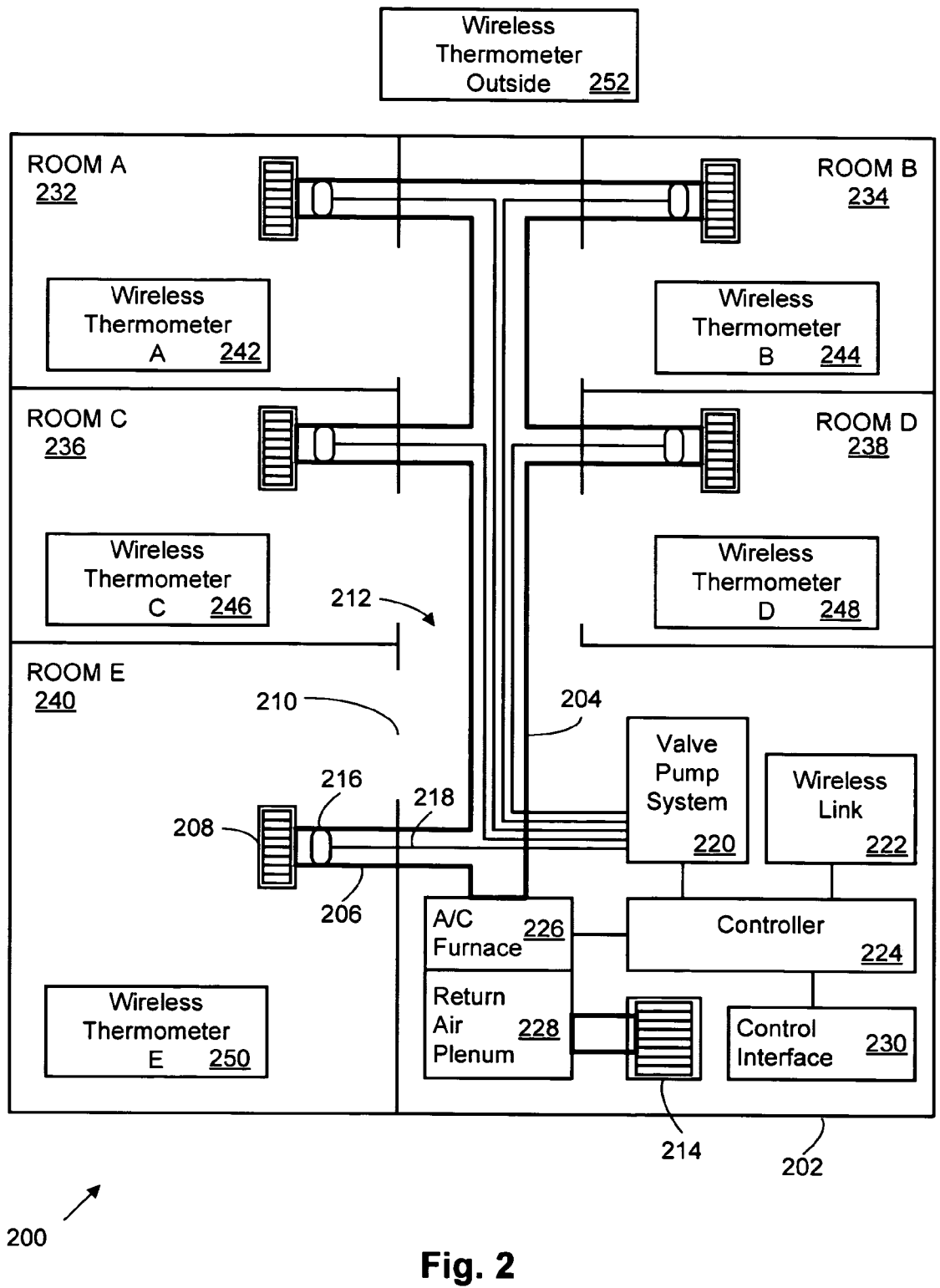
FIG. 2 illustrates an exemplary residential home with a forced air climate control system utilizing an embodiment of the invention.

FIG. 2 illustrates an exemplary residential home with a forced air climate control system utilizing an embodiment of the invention. In this particular example, the home 200 is a building 202 that includes five rooms, room A through E 232-240. Each "room" may include one physical room, or it may include one or more rooms whose air is conditioned together as a zone.

The climate control system includes an air conditioner, furnace, or other such conditioning apparatus 226, which provides conditioned, forced air into a primary trunk duct 204. The conditioned air is provided into the rooms via secondary ducts 206 that extend from the primary trunk duct to respective vents 208 in the various rooms. In most instances, the conditioned air returns from the room by passing out the room's door 210, but in some instances there may be return air ducts (not shown) in some or all of the rooms. The air returning from the various rooms mixes to some extent in the hallways 212 connecting the rooms and the common areas, and eventually returns into a return air vent 214, which feeds into the return air plenum 228 of the furnace 226.

Operation of the air conditioner or furnace 226 is managed by a controller 224. In one embodiment, each room 232-240 is equipped with a wireless thermometer, thermometers A-E 242-250, and the controller 224 is equipped with a wireless link 222 that interfaces with the wireless thermometers 242-250 to receive data from the thermometers. There may also be a wireless thermometer outside the house 252 that reports the outside air temperature to the climate control system. There further may be sensors to provide data feeds regarding the status of the climate control equipment.

In one embodiment, the conditioned air vent in each room 208 is equipped with an airflow control mechanism, such as, for example, a controllable damper 216 that can be opened and closed to permit or prevent air from passing from the duct into the room. In one such embodiment, the dampers are inflatable bladders that are coupled to a valve pump system 220 by pneumatic tubes 218 disposed within the ducts. The bladders are individually inflated and deflated by the valve pump system 220, whose operation is managed by the controller 224.

The controller is equipped with one or more control interfaces 230, via which the user interacts with the climate control system. The control interface includes a visual display that presents information to the user, and an input apparatus that accepts commands from the user. The particular details of the display controller may vary in different embodiments. In one embodiment, the display interface comprises a liquid crystal touch panel display that functions both as the output device and the input device.

The user provides inputs and commands via the control interface 230 to control various aspects of the operation of the climate control system. For example, the user may switch the system from a "standby" or "off" mode to an "on" mode. In another example, the user may adjust the thermostat setting for the house or for a particular room. Further, the user may alter the conditioning schedule for the house or for a particular room.

In the operation of a complex climate control system, a user is generally required to make climate control changes without any direct knowledge of how the changes will affect the system. Thus, the user may discover that certain rooms are cooler or warmer than desired, but may be uncertain what system constraints are relevant or how to reach input screens to address the relevant constraints. In an embodiment of the invention, the control interface 230 may provide information regarding current activities of the climate control system, and may provide information identifying one or more primary constraints or conditions that are causing or influencing the current activities of the system. Further, the control interface may provide direct access to the identified primary constraints to allow the user to make any desired changes.

Figure 3:
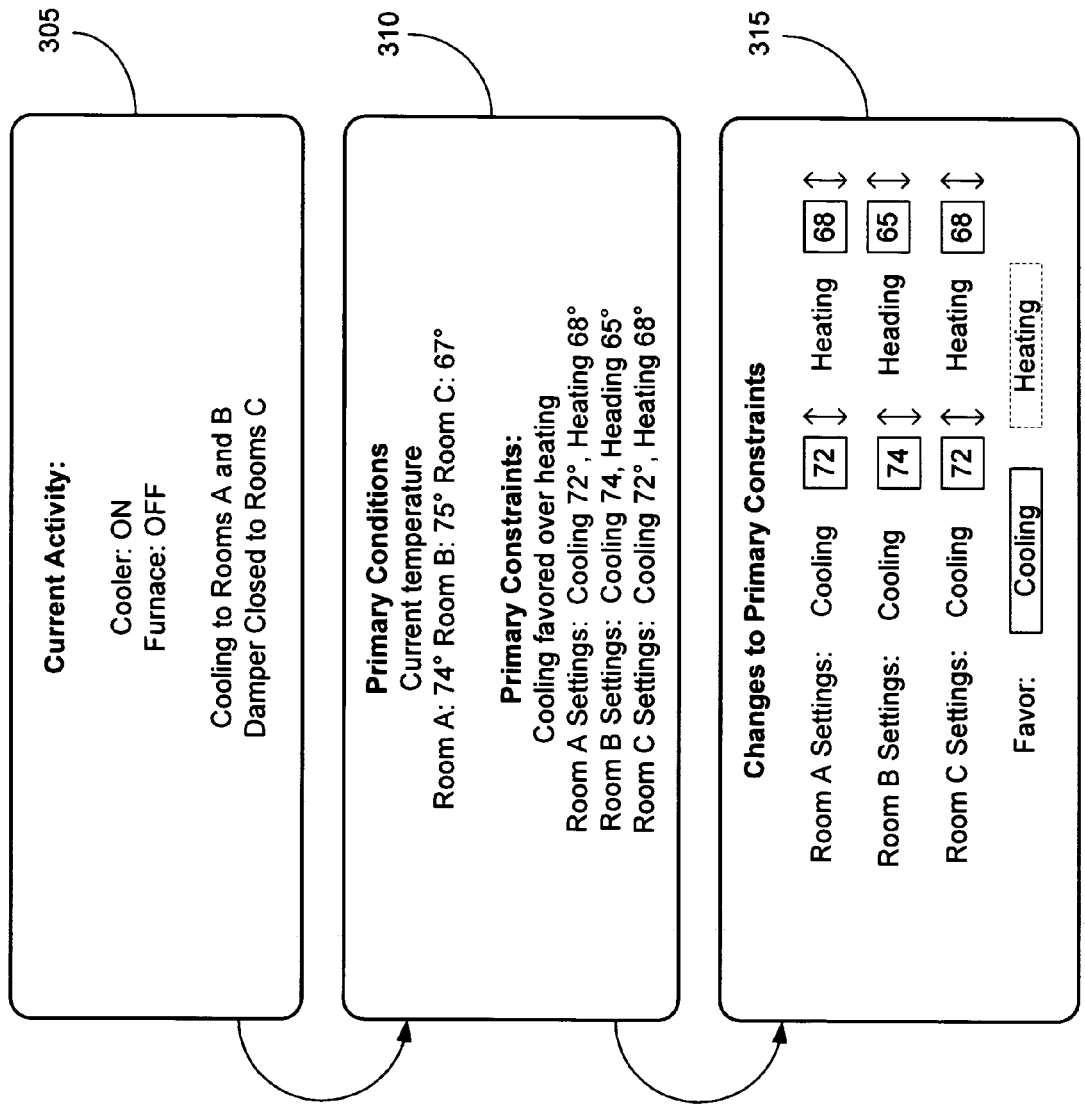
FIG. 3 illustrates an embodiment of a control display for a climate control system.

FIG. 3 illustrates an embodiment of a control display for a climate control system. FIG. 3 is not intended to represent an actual display, but is rather intended to illustrate the information that may be provided through the control interface. For example, a first screen 305 may indicate the current activity of the climate control system. As illustrated, the cooler is on and the furnace is off. There is cooling provided to rooms A and B, with the damper being closed to room C. The user may, for example, be present in room C and may feel that the room is too cold.

The user may then move to a second screen 310, which indicates the primary conditions and constraints influencing the current activity. As shown, the room temperatures are provided to the user. Rooms A and B are warmer than their cooling settings, while room C is cooler than its heating setting. However, this may occur in, for example, summer months and a constraint has been set that favors cooling over heating. Based on this information, the user can quickly understand the temperature conditions and can see that the cooling preference is preventing heating of room C.

The user may request to modify the primary constraints, and then is provided a third screen 315 containing shortcuts to the constraint settings, thereby providing direct access to these elements. These settings may normally be reachable through a series of menu levels and thus the user is saved considerable effort in locating the settings. The user may choose to change temperature settings, but may also simply choose to favor heating over cooling. The change could be made permanently, or may be temporary to allow heating for a certain period of time, with the permanent settings again becoming effective after the temporary period ends. In an embodiment of the invention, the display may also display information regarding what amount of change in a constraint setting is needed to provide a desired result.

Figure 4:
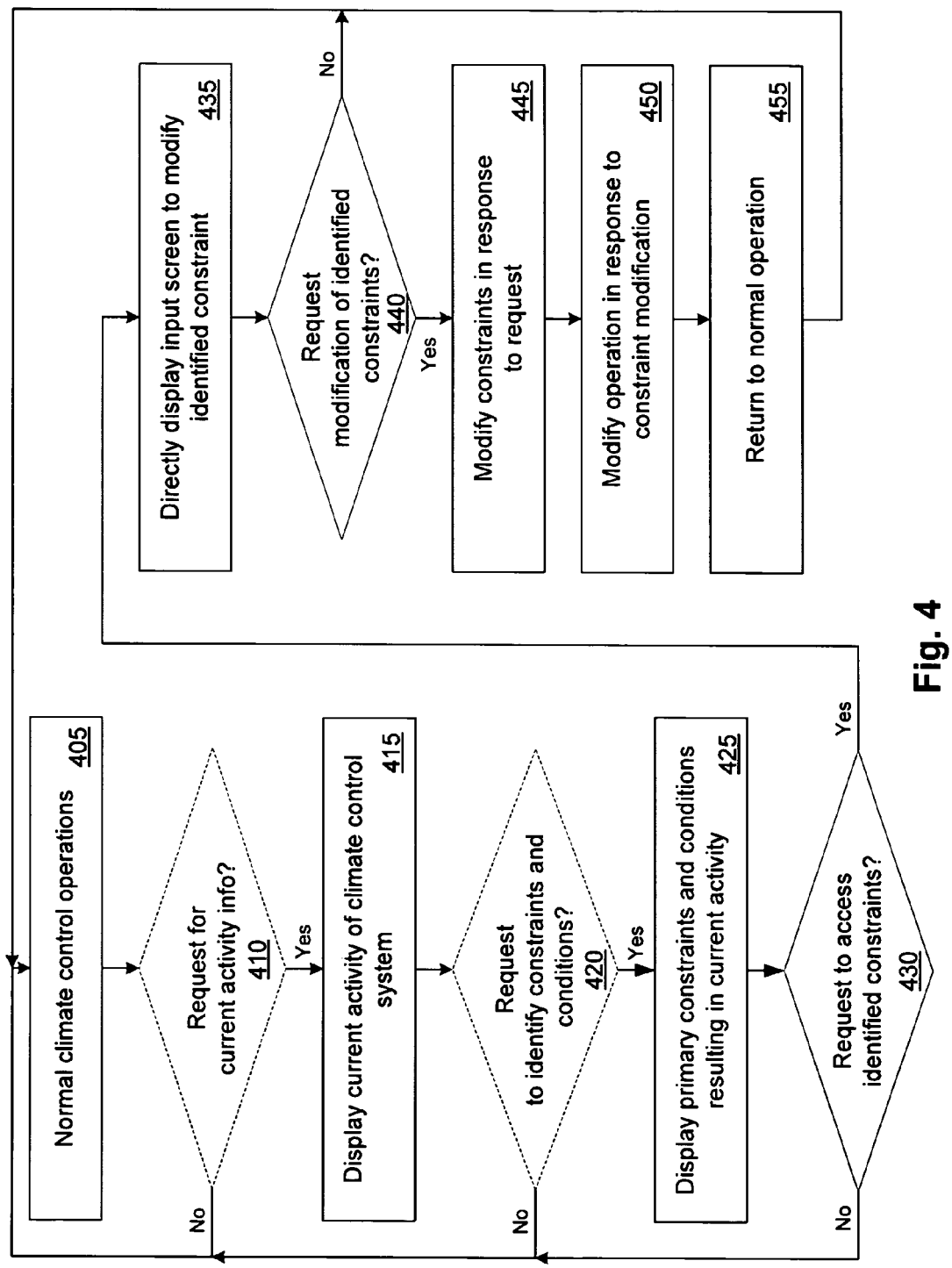
FIG. 4 is a flowchart to show an embodiment of a climate control display and control process.

FIG. 4 is a flowchart to show an embodiment of a climate control display and control process. A climate control system may begin in a normal operation state 405. The system may optionally allow a request for current activity information 410, or may without request display current activity of the climate control system 415. The system may allow for a request to identify constraints and conditions 420, or may without request display the primary constraints and conditions that influence or result in the current activity 425. If the user wishes to access the identified constraints 430, the system may directly display an input screen to modify the identified constraints 435. If the user inputs a request to modify one or more constraints 440, the system will modify such constraints 445 and will modify the climate control operation as necessary to respond to the constraint modification 450. The system may then return to normal operations 455.

Figure 5:
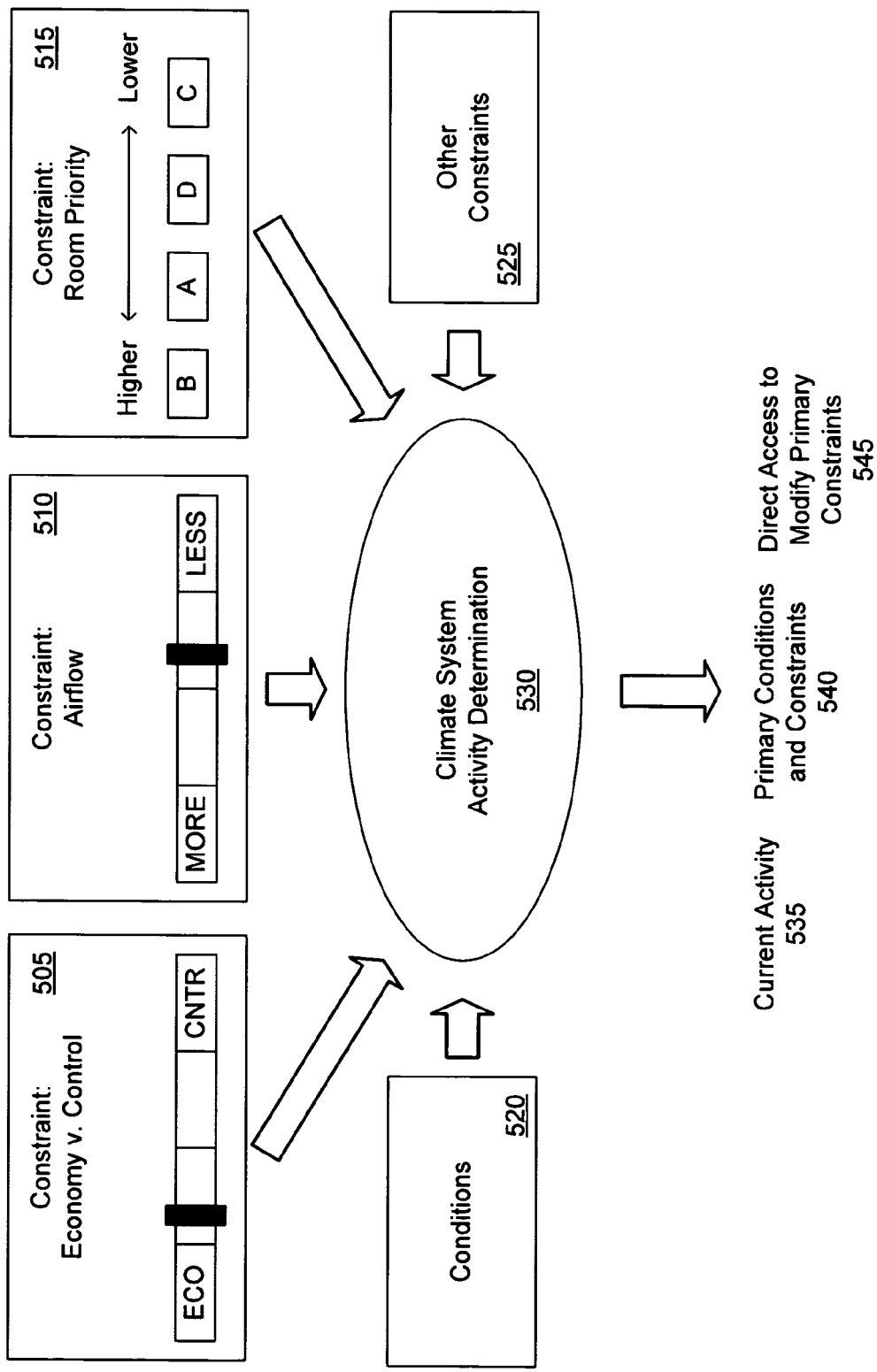
FIG. 5 is an illustration of climate control determinations made in an embodiment of the invention.

FIG. 5 is an illustration of climate control determinations in an embodiment of the invention. In this illustration, various constraints and conditions are weighed in determining the current activity of the climate control system. For example, an economy versus control constraint 505 may allow the user to choose a constraint level between the economy and control extremes. Further, an airflow constraint 510 may allow a user to choose a preference for more or less airflow (and thus noise) between the higher and lower extremes. A room priority constraint 515 may allow the user to order the rooms in priority order, with the higher ordered rooms getting higher priority in determining system activity. In addition, there are climate and system conditions 520 and other constraints 525 to be considered. All of the relevant constraints and conditions are weighed and balanced in the climate control determination 530. In an embodiment of the invention, the climate system then outputs information regarding the current climate control activity 535 and primary conditions and constraints influencing the choice of the current climate control activity 540, and provides direct access to modify the primary constraints as needed 545.

Figure 6:
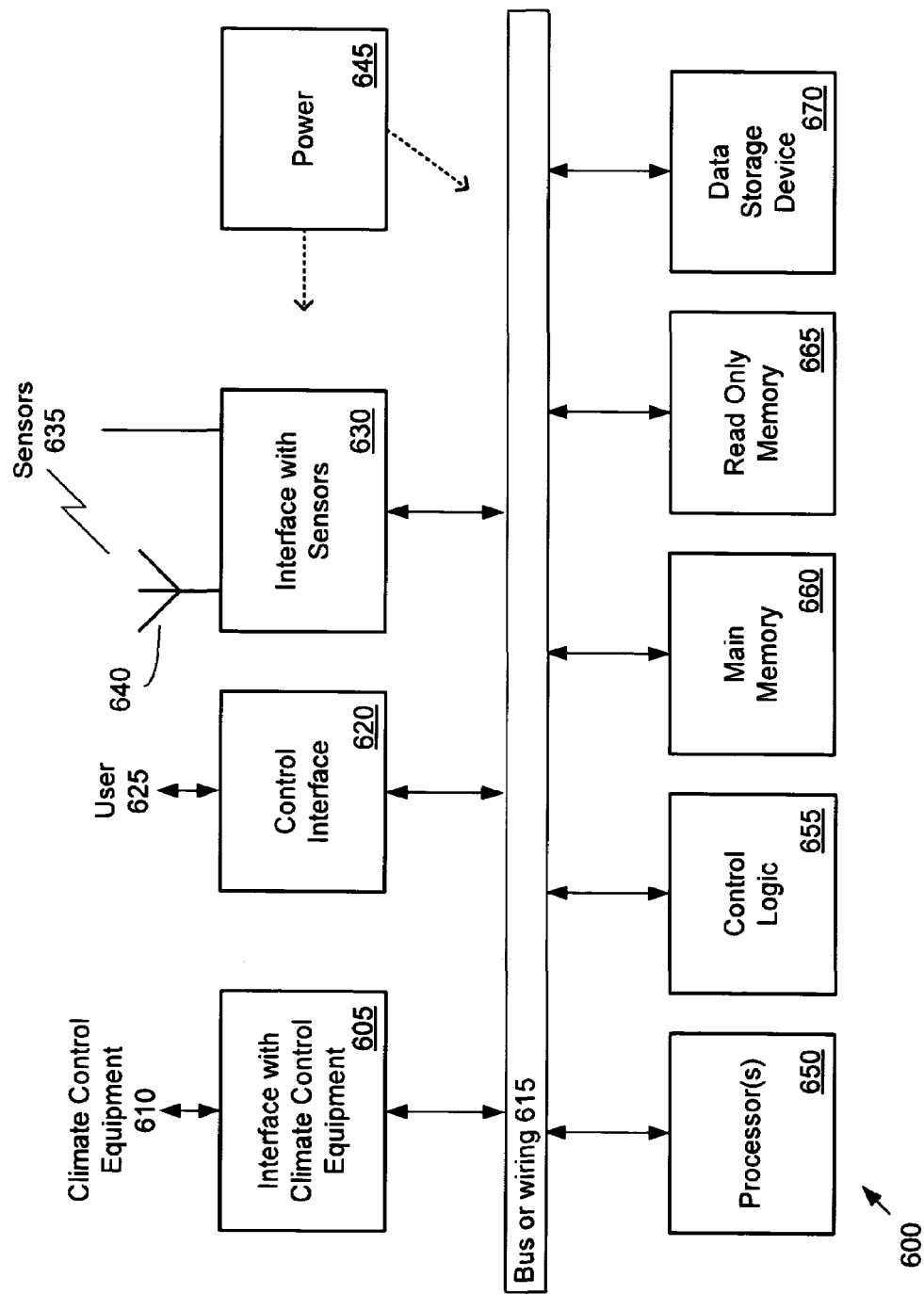
FIG. 6 is an illustration of an embodiment of a controller for an environment control system.

FIG. 6 is an illustration of an embodiment of a controller for an environment control system. Certain standard and well-known components that are not germane to the present invention are not shown. Under an embodiment of the invention, a controller 600 comprises a bus or wiring 615 or other communication means for communicating information, and a processing means such as one or more processors 650 coupled with the bus or wiring 615 for processing information. The controller 600 may include control logic 655 to provide certain control capabilities.

The controller 600 may include a random access memory (RAM) or other dynamic storage device as a main memory 660 for storing information and instructions to be executed by the processor 650 or control logic 655. Main memory 660 also may be used for storing temporary variables or other intermediate information during execution of instructions by the processor 650. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The controller also may comprise a read only memory (ROM) 665 or other static storage device for storing static information and instructions, including firmware, for the processor 650 or the control logic 655.

A data storage device 670 may also be coupled to the bus or wiring 615 of the controller 600 for storing information and instructions. The data storage device 670 may include a magnetic disk or optical disc and its corresponding drive, flash memory or other nonvolatile memory, or other memory device. Such elements may be combined together or may be separate components, and utilize parts of other elements of the controller 600.

The controller 600 includes a climate control equipment interface 605 to connect to the climate control equipment or units 610 that are under control. The controller 600 may further include one or more control interfaces 620 to provide an interface with a user 625. The control interface 620 may include, but is not limited to, a liquid crystal display (LCD) or other display technology for displaying information to an end user. In some environments, the control interface 620 may include a touch-screen that is also utilized as at least a part of an input device. The control interface 620 may include any other type of input, including a keyboard, a keypad, a touch-screen and stylus, a voice-activated system, or other input device, or combinations of such devices.

The controller 600 further includes a sensor interface 630 to communicate with one or more sensors 635. The sensors 635 may include, but are not limited to, temperature sensors and equipment status sensors. The sensor interface 630 may connect with the sensors 635 via wires or by a wireless connection (such as using antenna 640). The controller 600 may also comprise a power device or system 645, which may comprise a power supply, a battery, a solar cell, a fuel cell, or other system or device for providing or generating power. The power provided by the power device or system 645 may be distributed as required to elements of the controller 600.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in computer-readable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of computer-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A control interface for a climate control system comprising:

a memory to store control constraints for the climate control system;

one or more sensors to measure climate conditions or equipment conditions;

a processor to choose a current climate control activity for the climate control system, the current climate control activity being based at least in part on a first plurality of the control constraints for the climate control system, the processor to identify one or more primary control constraints of the first plurality of control constraints, the one or more primary control constraints being primary influences on the choice of the current climate control activity by the processor; and a user control interface to provide information on a user display to a user, the information on the user display including:

the current climate control activity of the climate control system;

the one or more primary control constraints identified by the processor; and access to a process for modifying the one or more primary control constraints.

2. The controller of claim 1, further comprising an interface with a climate control unit.

3. The controller of claim 2, the climate control unit being a unit selected from the group consisting of a furnace, a cooler, and a humidifier.

4. The controller of claim 1, wherein the one or more sensors include a temperature sensor.

5. The controller of claim 1, wherein the one or more sensors include a sensor to determine a status of the climate control system.

6. The controller of claim 1, wherein the information provided on the user display further includes identification of a magnitude of change required in the one or more primary control constraints to change the choice of the current climate control activity by the processor.

7. The controller of claim 1, wherein information regarding access to the process for modifying the one or more primary control constraints identified by the processor includes a shortcut process for receiving input to directly modify a first primary control constraint without being required to follow normal processes to reach an input screen for modification of the first primary control constraint.

8. The controller of claim 1, wherein the information on the user display further includes information regarding a process for specifying a temporary duration for the modification to the first control constraint to be in effect.

9. A control interface for a climate control system comprising:

one or more climate control devices;

a control unit to control the one or more climate control devices, the control unit including control constraints on the operation of the one or more climate control devices, the control unit to choose a current activity of the climate control system based on a first plurality of control constraints and to identify one or more primary control constraints, the one or more primary control constraints being primary influences for the choice of the current activity by the control unit; and a control interface, the control interface providing information on a display screen, the information displayed by the control interface on the display screen to include:

the current activity of the climate control system;

the one or more primary control constraints that are identified by the control unit; and access to a process for modifying the one or more primary control constraints.

10. The system of claim 9, wherein the climate control devices provide one or more activity selected from the group comprising heating, cooling, and humidification.

11. The system of claim 9, wherein the process for modifying the one or more primary control constraints includes modification without following normal procedures to reach an input screen to change the one or more primary control constraints.

12. The system of claim 11, wherein the information displayed by the control interface on the display screen further includes identification of a magnitude of change required in the one or more primary control constraints to change the choice of the current climate control activity by the control unit.

13. The system of claim 11, wherein the access to the process for modifying the one or more primary control constraints includes a process for imposing a temporary duration for the modification to be in effect.

14. The system of claim 9, wherein the first control constraint is an abstract constraint that is dependent on a plurality of conditions.

15. The system of claim 9, further comprising a sensor to measure a current climate condition or a status of the climate control system, wherein a first primary control constraint of the one or more primary control constraints is utilizes a measurement of the sensor.

16. A method for a control interface of a climate control system comprising:

choosing by a processor a current climate control activity for the climate control system, the choice of the current climate control activity being based at least in part on a first plurality of control constraints for the operation of the climate control system;

identifying by the processor one or more primary control constraints of the first plurality of control constraints, the one or more primary control constraints being primary influences on the choice of the current climate activity by the processor;

displaying on a user display information regarding;

the current activity of the climate control system; and the one or more primary control constraints identified by the processor; and a screen to provide access to a process for modifying the one or more primary control constraints.

17. The method of claim 16, further comprising determining a magnitude of change that is required in the one or more primary control constraints to change the choice of the current climate control activity by the processor and displaying the magnitude of change on the user display.

18. The method of claim 16, wherein the process for modifying the one or more primary control constraints allows direct modification of the one or more primary control constraints without accessing a standard menu for changing the control constraints.

19. The method of claim 16, wherein the process for modifying the one or more primary control constraints includes a process for establishing a temporary duration for the modification.

20. The method of claim 16, further comprising receiving a request to modify a first primary control constraint.

21. The method of claim 20, further comprising changing the current activity based at least in part on the modified first primary control constraint.

22. A computer-readable medium having stored thereon data representing sequences of instructions that, when executed by a processor, cause the machine to perform operations comprising:

choosing by a processor a current climate control activity for the climate control system, the choice of the current climate control activity being based at least in part on a first plurality of control constraints for the operation of the climate control system;

identifying by the processor one or more primary control constraints of the first plurality of control constraints, the one or more primary control constraints being primary influences on the choice of the current climate activity by the processor;

displaying on a user display information regarding;

the current activity of the climate control system; and the one or more primary control constraints identified by the processor; and a screen to provide access to a process for modifying the one or more primary control constraints.

23. The medium of claim 22, further comprising instructions that, when executed by the processor, cause the processor to perform operations comprising:

determining a magnitude of change that is required in the one or more primary control constraints to change the choice of the current climate control activity by the processor and displaying the magnitude of change on the user display.

24. The medium of claim 23, wherein the process for modifying the one or more primary control constraints includes a process for establishing a temporary duration for the modification.

25. The medium of claim 22, further comprising instructions that, when executed by the processor, cause the processor to perform operations comprising:

receiving a request to modify a first primary control constraint.

26. The medium of claim 25, further comprising instructions that, when executed by the processor, cause the processor to perform operations comprising:

changing the current activity based at least in part on the modified first primary control constraint.

27. The controller of claim 1, wherein the one or more primary control constraints includes a prioritization between climate control activities.

28. The controller of claim 1, wherein the one or more primary control constraints includes an abstract control constraint that is not defined solely by measurements of the one or more sensors.

\* \* \* \* \*